United States Patent [19]

Hayashi

[11] Patent Number: 4,795,278

[45] Date of Patent: Jan. 3, 1989

[54] BEARING ASSEMBLY

[75] Inventor: Yoshitaka Hayashi, Fujisawa, Japan

[73] Assignee: Nippon Seiko Kabushiki Kaisha, Tokyo, Japan

[21] Appl. No.: 123,205

[22] Filed: Nov. 20, 1987

[30] Foreign Application Priority Data

| Nov. 28, 1986 [JP] | Japan | 61-182040[U] |
| Apr. 1, 1987 [JP] | Japan | 62-77450 |
| Jul. 28, 1987 [JP] | Japan | 62-186665 |

[51] Int. Cl.⁴ .............. F16C 19/52; G01P 3/487; H02K 21/38
[52] U.S. Cl. .................. 384/448; 384/544; 310/155; 310/168; 324/174; 324/208
[58] Field of Search ............ 384/8, 446, 448, 624, 384/535, 544; 324/174, 166, 207, 208; 310/90, 155, 168

[56] References Cited

U.S. PATENT DOCUMENTS

| 3,626,226 | 12/1971 | Pauwels | 324/174 X |
| 3,890,517 | 6/1975 | Marsh et al. | 310/168 |
| 3,916,234 | 10/1975 | Stigall et al. | 310/155 |
| 4,017,756 | 4/1977 | Davidson | 310/168 |
| 4,171,495 | 10/1979 | McNinch, Jr. | 310/155 |
| 4,259,637 | 3/1981 | Bloomfield et al. | 324/208 X |
| 4,667,156 | 5/1987 | Machino et al. | 384/535 X |

Primary Examiner—Stuart S. Levy
Assistant Examiner—Thomas R. Hannon
Attorney, Agent, or Firm—Shapiro and Shapiro

[57] ABSTRACT

A bearing assembly comprising a bearing including an inner and outer rings one of which is fixed to a rotating member, and a pulser gear fixed to the rotating member. The pulser gear is composed of an annular magnetic plate member and having a plurality of punched through holes mutually separated along a circumferential direction thereof. Revolution of the rotating member can be detected by a sensor provided close to the pulser gear.

16 Claims, 8 Drawing Sheets

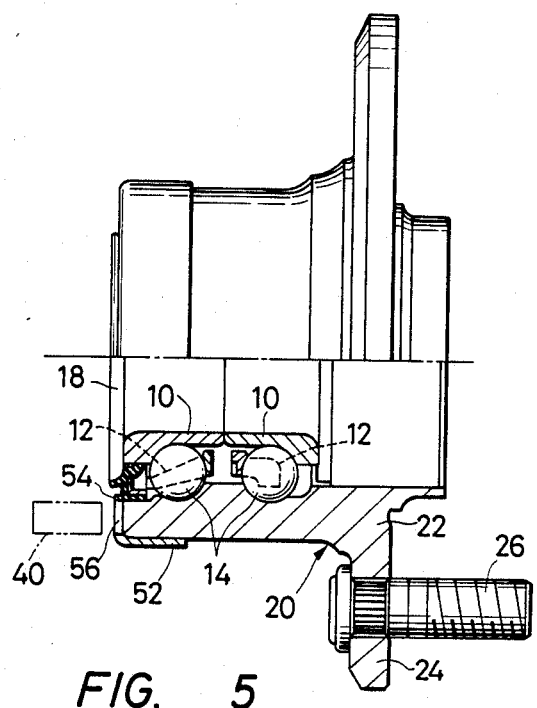
FIG. 4
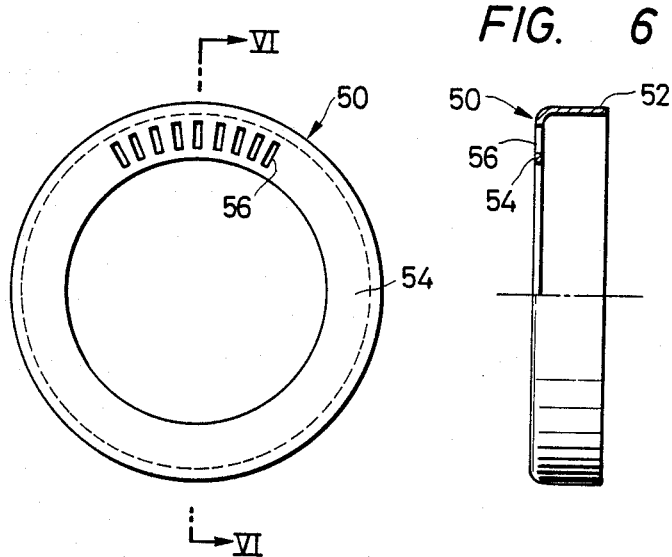
FIG. 5
FIG. 6

BEARING ASSEMBLY

BACKGROUND OF THE INVENTION

1. Field of the Invention

The present invention relates to a bearing assembly, and more particularly to an improvement in a bearing assembly capable of detecting the rotation of a rotary member integral with an outer ring.

2. Related Background Art

Bearing assemblies are employed for supporting rotating parts in various machines, and it often becomes necessary to detect the rotation of such rotating part. A typical example is found in an anti-skid braking system for a vehicle, in which the rotation of a wheel is detected and the braking action is temporarily released when the wheel approaches a locking state, thus preventing the wheel locking phenomenon. The rotation can be conveniently detected by a sensor utilizing a pulser gear or a sensor rotor fixed to the outer ring and an electromagnetic pickup.

Conventionally the pulser gear is composed of an annular member of a magnetic material, having gear teeth on the outer periphery, and said annular member is fitted on the outer periphery of the outer ring. The gear teeth have to be made by broaching, by mechanical working with a gear cutter, or by sintering. However, broaching or other mechanical working requires a high cost, while sintering cannot provide a sufficient strength and cannot be easily made rust-proof.

Also the pulser gear is obtained by forming plural projections in the radial direction with a constant interval, on the outer periphery of an annular member composed for example of a plate member of a magnetic material. The surface of the annular member is usually subjected to antirusting treatment, but the rotating ring is not subjected to such treatment. Consequently, the pulser gear and the rotating ring constitute a direct contact of different metals, which induces rusting in the pulser gear due to electric erosion if they are exposed, for example, to rain or water. Such rusting reduces the ability of inducing magnetic flux change in the sensor, thus deteriorating the precision of detecting the revolution.

In order to prevent such phenomenon, the antirusting treatment may also be applied to the surface of the rotating ring, but such solution will significantly raise the production cost. Also, dimensional error, if present on the mounting surface of the rotating ring or on the fitting surface of the pulser gear, will hinder adequate mounting of the two. However, an improved precision of working, if employed for preventing such dimensional error, will also raise the production cost.

SUMMARY OF THE INVENTION

An object of the present invention is to eliminate the above-mentioned drawbacks in the prior technology and to provide a bearing assembly containing a pulser gear which is easy to produce, is inexpensive, has a sufficient strength, and can be subjected to an anti-rusting treatment easily i necessary.

Another object of the present invention is to provide a bearing assembly containing a pulser gear of which gear teeth can be set at a desired position when required.

Still another object of the present invention is to provide a bearing assembly capable of preventing rust generation on the sensor rotor even when the rain or water touches the rotating ring and/or sensor rotor, and capable of allowing satisfactory mounting of the sensor rotor on the rotating ring even in the presence of a certain dimensional error in said sensor rotor and/or said rotating ring.

The above-mentioned objects can be achieved, according to the present invention, by the use of a pulser gear or sensor rotor composed of an annular magnetic member having punched windows or holes. Said windows may be punched in a belt-shaped material before it is formed into an annular shape, or after formation into annular shape. When such pulser gear is fitted on the outer gear, the external periphery thereof constitutes the bottom face of the windows, whereby projections and recesses are alternately formed circumferentially by said pulser gear along the surface of the outer ring.

The projections and recesses of the pulser gear cause changes in the magnetic flux generated by a sensor positioned close to said pulser gear, and the revolution of the wheel can be detected by examining the change of the magnetic flux of the sensor.

Also according to the present invention, the pulser gear may be composed of a plate-shaped magnetic material formed into an annular shape, having at least a cylindrical mounting portion to be mounted on the rotating ring and a gear portion radially distant toward the outside and having a plurality of punched windows in the circumferential direction. Said gear portion may be formed as a flange in continuation to the mounting portion, or may be formed parallel to the mounting portion (displaced or not in the axial direction) via a connecting portion.

Thus the magnetic flux generated by a sensor positioned close to the pulser gear is transmitted or intercepted by the windows or ribs thereof, so that the revolution of the rotating ring or a member integral therewith can be detected by the sensor.

Also according to the present invention, the sensor rotor may be composed of a magnetic annular member having plural separate apertures along the periphery, and a plastic protective member covering the surface, at least the mounting surface onto the rotating ring, of said annular member. Said annular member may be formed as a cylinder, a hollow disk, with a square U-shaped cross section or with an L-shaped cross section, and the sensor rotor will be of a corresponding form.

In this manner the annular member is mounted on the rotating ring through the protective member, whereby the direct contact between the annular member and the rotating ring can be avoided, and a certain deformation is permitted in the protective member in the mounting of the sensor rotor on the rotating ring.

According to the present invention, the use of a plate-shaped material for the annular member constituting the pulser gear enables easy and inexpensive manufacture thereof. Also the plural windows can be formed with precise shape and dimension, thus inducing proper changes in the magnetic flux from the sensor, thereby enabling exact detection of the revolution. Also if the pulser gear is mounted on the outer ring through a cylindrical member, a same pulser gear may be mounted on various outer rings by merely changing the cylindrical member.

Furthermore, the mounting position of the gear portion of the pulser gear, or the relative position thereof to the rotating ring, can be arbitrarily selected in the radial direction, with an increased number of detection modes.

Furthermore, the use of a window structure in the area for transmitting the magnetic flux scarcely affects the strength of the gear portion, so that the deformation of the pulser gear can be prevented in the preparation of the pulser gear or in the subsequent handling thereof.

Further according to the present invention, the sensor rotor composed of a magnetic annular plate-shaped member and a plastic protective member covering the surface thereof prevents rusting of the annular member of the sensor rotor even when it is exposed to rain or water, thereby enabling exact detection of the rotation of the rotating member. Also the protective member, being capable of deformation to a certain extent, eliminates the need for strict control of the dimensional precision of the annular member and the rotating ring, thereby reducing production cost.

BRIEF DESCRIPTION OF THE DRAWINGS

FIG. 4 is a partially cut-away elevation view of a second embodiment of the present invention;

FIG. 5 is an elevation view of a pulser gear employed therein;

FIG. 6 is a cross sectional view along a line VI—VI in FIG. 5;

DETAILED DESCRIPTION OF THE PREFERRED EMBODIMENTS

Now, the present invention will be described in detail based on preferred embodiments thereof shown in the attached drawings, applied to an anti-skid braking system for a vehicle.

Figure 1:
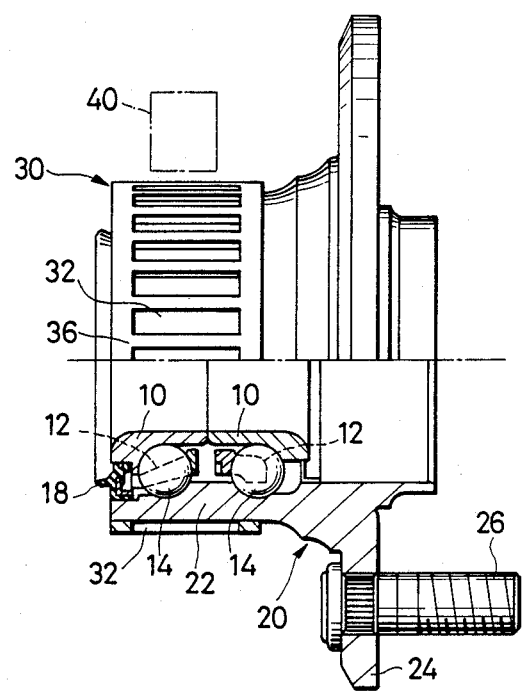
FIG. 1 is a partially cut-away elevation view of a first embodiment of the present invention.

As shown in FIG. 1, the bearing assembly is a so-called angular contact bearing, comprising a pair of inner rings 10 parallel in the axial direction, and an integral outer ring 20 positioned outside thereof and concentric therewith, with two rows of balls 14 supported by a supporting member 12 therebetween. A seal member 18 is provided between an outer rim of an inner ring 10 and a corresponding outer rim of the outer ring 20.

The outer ring 20 is provided with a main portion 22 and a radially extended flange portion 24, which is fixed, by penetrating bolts 26, with a brake and a wheel, not shown in the drawing.

Figure 2:
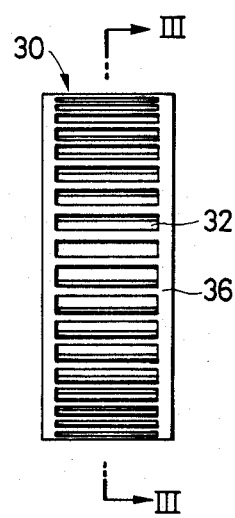
FIG. 2 is an elevation view of a pulser gear employed therein.
Figure 3:
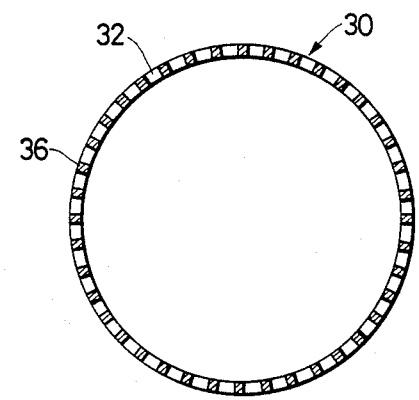
FIG. 3 is a cross sectional view along a line III—III in FIG. 2.

On the outer periphery of the outer ring 20 there is mounted a cylindrical pulser gear 30, which is composed of a magnetic material. As shown in FIGS. 2 and 3, it has a fixed width and is provided, along the periphery thereof, with plural axially oblong rectangular windows 32. The pulser gear 30 is pressure fitted on the main portion 22 of the outer ring 20, whereby the outer periphery of said main portion 22 constitutes the bottom faces of the windows 32 so that projections and recesses are alternately formed on the outer periphery of the main portion 22.

Said pulser gear may be obtained by punching windows in a strip material and bending and bonding said strip material into an annular form, or by punching windows in a tubular material. The bearing assembly is set by fitting the inner rings 10 on a fixed shaft (not shown). For detecting the revolution of the wheel, a sensor pickup 40 is positioned close to the pulser gear 30 as indicated by broken lines in FIG. 1.

When the wheel rotates, the outer ring 20 and the pulser gear 30 thereon integrally rotate so that the recesses or windows 32 and the projections or rib portions 36 of said pulser gear 30 alternately pass before the sensor 40. Consequently, the magnetic flux is periodically varied by the pulser gear 30, and the rotation of the wheel can be detected by examining said variation.

In the present embodiment, the windows 32 constituting the recesses are formed as exact rectangles with constant form and dimension throughout the thickness of the pulser gear, and the projections 36 have a constant thickness. Consequently the passing magnetic flux is regularly modulated by said recesses and projections, thus enabling precise detection of the revolution. Significantly, from a production point of view, the thin cylindrical pulser gear member 30, can be easily made and is inexpensive. Furthermore, being light in weight, it does not affect undesirably the rotation of the outer ring 20, and, constituting only a small projection in the radial direction, it does not interfere with the peripheral devices.

FIGS. 4 to 6 show another embodiment of the present invention, which is different in the cross sectional form of the pulser gear from the foregoing embodiment. As shown in FIGS. 5 and 6, an annular pulser gear 50 has an L-shaped cross section composed of a cylindrical portion 52 and a radially extended flange portion 54, and said flange portion 54 is provided with radially oblong rectangular windows 56 at a constant pitch along a circle. In the drawing windows are shown in only a part of flange portion 54 for purposes of simplicity. The pulser gear 50 is fitted, by the cylindrical portion 52, onto the outer periphery of the main portion 22 of the outer ring, and the end face of the main portion 22 of the outer ring is in contact with the flange portion 54 to constitute the bottom faces of the windows 56. In this case the sensor 40 is positioned, as indicated by broken lines in FIG. 4, axially adjacent to the flange portion.

Said pulser gear 50 can be obtained by forming a bucket-shaped member by a drawing work, and by punching windows 56 in the flange portion 54, and provides advantages essentially the same as those in the foregoing embodiment. Also there is obtained flexibility in the positioning of the sensor 40.

Figure 7:
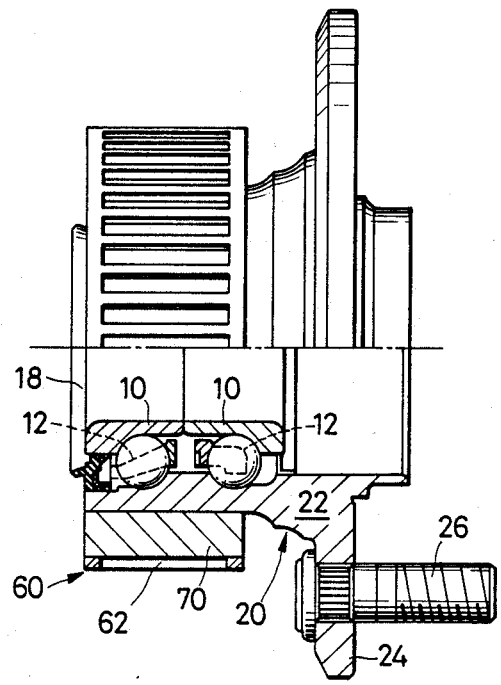
FIG. 7 is a partially cut-away elevation view of a third embodiment of the present invention.

FIG. 7 shows still another embodiment, which is featured by a fact that a pulser gear 60 is mounted, by means of a cylindrical member 70, on the main portion 22 of the outer ring. More specifically, a metal or plastic cylindrical member 70 is mounted on the main portion 22 of the outer ring, and a cylindrical pulser gear 60 having windows 62 is mounted on said cylindrical member.

In this manner a single pulser gear 60 may be used on various outer rings, by simply changing the cylindrical member, and this fact will contribute to the cost reduction of the bearing assembly.

Figure 8:
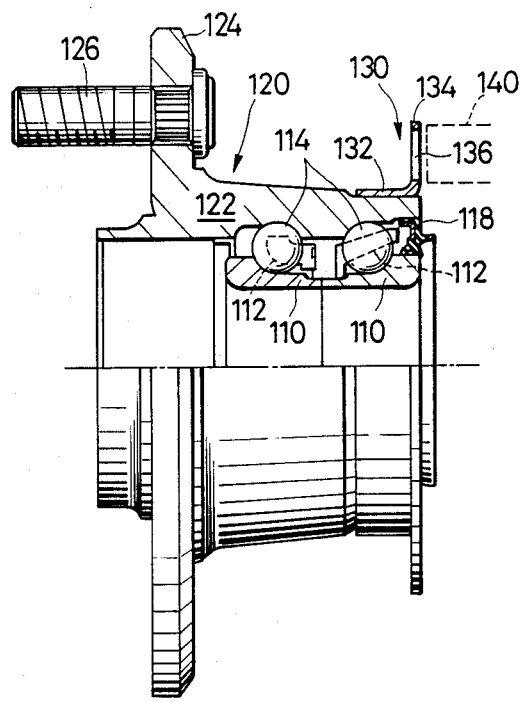
FIG. 8 is a partially cut-away elevation view of a fourth embodiment of the present invention.

The bearing assembly shown in FIG. 8 is a so-called angular contact bearing, comprising a pair of inner rings 110 parallel in the axial direction, and an integral outer ring 120 positioned outside thereof and concentric therewith, with two rows of balls 114 supported by a support member 112 therebetween. A seal member 118 is provided between an outer rim of one inner ring 110 and a corresponding outer rim of the outer ring 120.

The outer ring 120 is provided with a main portion 122 and a radially extended flange portion 124, which is fixed, by penetrating bolts 126, to a brake and a wheel, not shown in the drawing.

Figure 9:
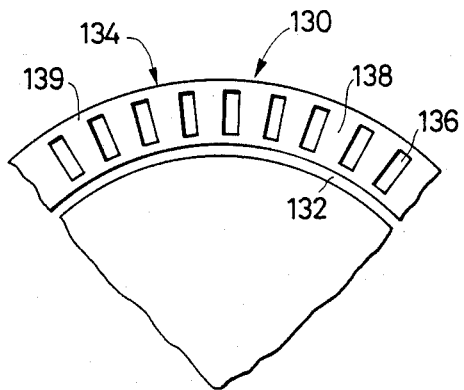
FIG. 9 is a partial elevation view of a pulser gear thereof.

On the outer periphery of the outer ring 120 there is mounted a pulser gear 130, composed of a magnetic material. Said pulser gear 130 has an L-shaped cross section, as shown in FIGS. 8 and 9, having a cylindrical mounting portion 132 and a flange-shaped gear portion 134 integrally connected thereto. The gear portion 134 is provided, along a circumferential direction, with a plurality of rectangular windows 136, extended in the radial direction and mutually spaced. The pulser gear 130 is fitted by the mounting portion 132 thereof onto the main portion 122 of the outer ring 120, and the rectangular windows 136 and the rib portions 138 of the gear portion 134 constitute areas 136 transmitting the magnetic flux and areas 138 intercepting the magnetic flux, alternating in a plane perpendicular to the axis.

The above-mentioned pulser gear 130 is obtained, by forming a strip material into an annular L-cross-sectioned member, and punching rectangular windows 136 by a press work in the gear portion 134. The bearing assembly itself is set by fitting the inner rings 110 on a fixed shaft (not shown). For detecting the revolution of the wheel, a sensor pickup 140 is positioned, as indicated by broken lines in FIG. 8, close to the pulser gear 130 in the axial direction.

The rotation of the wheel causes integral rotation of the outer ring 120 and the pulser gear 130 mounted thereon, whereby the rectangular windows 136 and the rib portions 138 of the pulser gear 130 alternately pass before the sensor 140, thereby creating periodical changes of the magnetic flux. The revolution of the wheel can be obtained by detecting said changes.

In the present embodiment, the pulser gear 130 can be easily and inexpensively made from a web-formed material. Also the flux-transmitting portions of the pulser gear 130 have sufficient strength, as they are form as rectangular windows instead of mere notches. If the gear portion 134 is formed as comb teeth with external notches, it inevitably loses mechanical strength and may show deformation from a real circle in the course of press work or use, thus deteriorating the accuracy of detection. However, the use of rectangular windows 136 provides an annular rim 139 at the external periphery of the gear portion 134, thus essentially avoiding the loss in mechanical strength. Also the gear portion can be limited in area in the radial direction of the outer ring 120, by suitable selection of the length of the gear portion 134 and the width and length of the rectangular windows 136.

Figure 10:
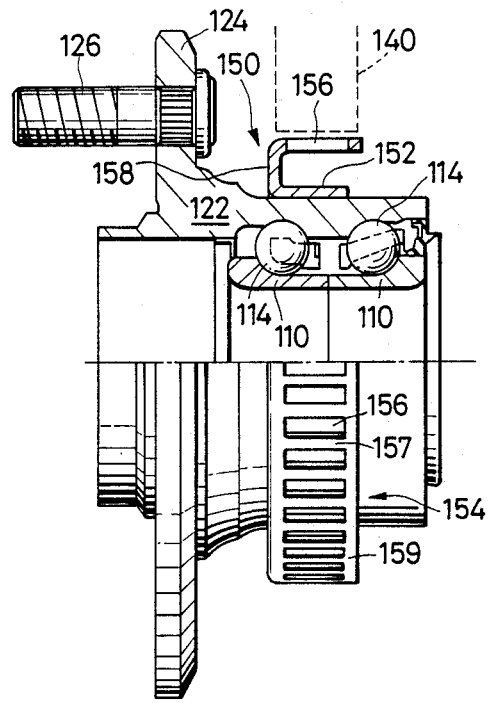
FIG. 10 is a partially cut-away elevation view of a fifth embodiment of the present invention.

An embodiment shown in FIG. 10 is different from the foregoing embodiment in the form of the pulser gear 150, which in this case is an annular member with a square-U cross section, consisting of a cylindrical mounting portion 152 for mounting on the main portion 122 of the outer ring, a gear portion 154 which is parallel to and somewhat longer than said mounting portion 152 and is provided with a plurality of axially oblong rectangular windows 156 distributed along the periphery thereof, and a radially extending connecting portion 158 connecting said mounting portion and said gear portion. The rectangular windows 156 and the rib portions 157 of the gear portion 154 are present alternately along the periphery and pass alternately before a sensor 140 positioned close to the pulser gear and directed inwards in the radial direction.

The present embodiment makes it easy to arbitrarily regulate the distance from the gear portion 154 to the external surface of the main portion 122 of the outer ring, through a change in the height of the connecting portion 158. Also, as the gear portion 154 is made somewhat longer than the mounting portion 152, with an annular rim 159 at the free end, it is rendered possible to enlarge the rectangular windows 156 without sacrificing the mechanical strength of the gear portion 154.

Figure 11:
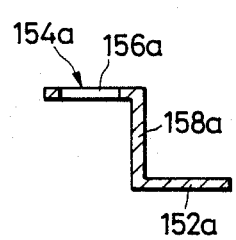
FIGS. 11 and 12 are cross sectional views showing variations of the pulser gear.
Figure 12:
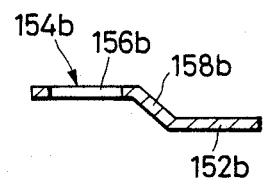

In case the gear portion is radially separated from the mounting portion, as shown in FIG. 11, the cylindrical mounting portion 152a and the gear portion 154a having rectangular windows 156a may be formed mutually parallel but axially displaced and are connected by a radially extending connecting portion 158a. Also as shown in FIG. 12, it is possible to form the cylindrical mounting portion 152b and the gear portion 154b having rectangular windows 156b mutually parallel and mutually displaced in the axial direction, and to connect the two with an inclined connecting portion 158b having an predetermined angle to the radial direction.

Figure 13:
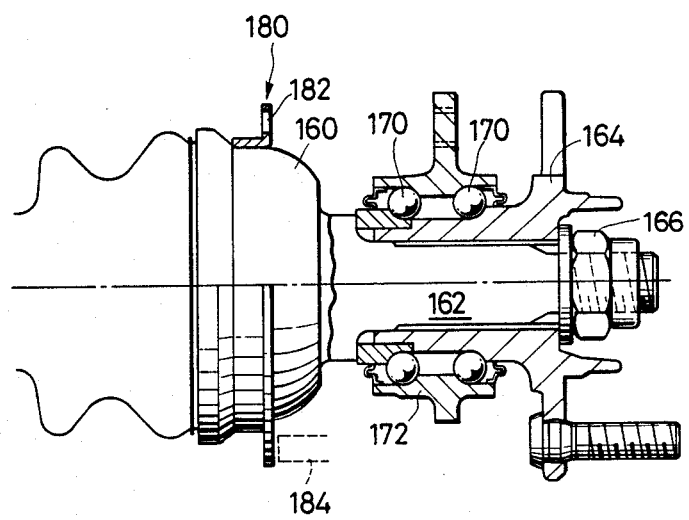
FIG. 13 is a partially cut-away elevation view of a sixth embodiment of the present invention.

In an embodiment shown in FIG. 13, an inner ring 164 is screwed, and fixed by a nut 166, on a rotary shaft 162 rotating integrally with an outer ring 160 of a constant-speed joint. Said inner ring 164 is rotatably supported by a fixed outer ring 122, with balls 170 therebetween.

On the outer ring 160 of said constant-speed joint there is mounted an annular pulser gear 180 of an L-shaped cross section, and a proximity sensor 184 is positioned close to rectangular windows 182 thereof. In this case the sensor 184 detects the rotation of the wheel.

Figure 14:
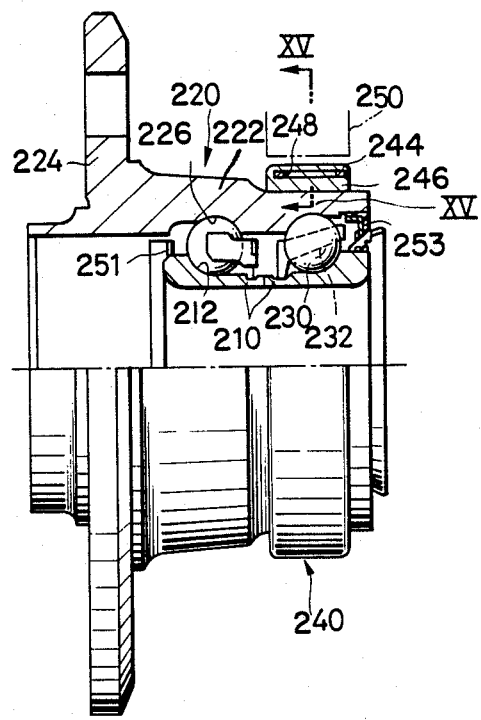
FIG. 14 is a partially cut-away elevation view of still another embodiment of the present invention.

A bearing assembly shown in FIG. 14 comprises a pair of inner rings 210, an outer ring 220 concentric therewith, two rows of balls 230 arranged between said rings, and a sensor rotor 240 fitted on the external periphery of a part of said outer ring 220.

Each inner ring 210 is provided with an outwardly open ball groove 212. The outer ring 220 is composed of a cylindrical portion 222 and a radially extending flange portion 224, and said cylindrical portion is provided, on the internal periphery thereof, with ball grooves 226 corresponding to said ball grooves 212, for supporting the balls 230 therebetween. The outer ring 220 is fixed, by the flange portion 224, to a vehicle body and a brake, not shown in the drawing. The balls 230 are supported by a support member 232.

Figure 15:
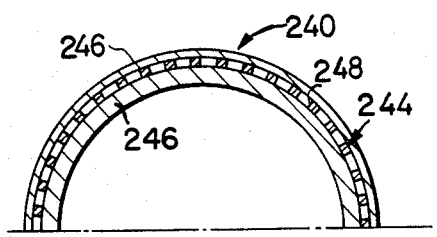
FIG. 15 is a cross sectional view along a line XV—XV in FIG. 14.

The sensor rotor 240 is composed of a magnetic annular member 244, and a plastic protective member 246 surrounding said annular member 244. More specifically, as shown in FIGS. 14 and 15, the annular member 244 has a cylindrical form, with an axially oblong rectangular cross section, and with an internal diameter somewhat larger than the external diameter of the cylindrical portion 222 of the outer ring 220, and is provided with a plurality of oblong rectangular apertures 248 mutually spaced along the periphery. The annular member 244 and the protective member 246 are constructed integrally, by placing the annular member 244 in a mold and molding a plastic resin thereon. Consequently the annular member 244 is protected by the protective member 246 on the external and internal peripheries and on the lateral faces, and the apertures 248 are also filled by the plastic resin. A sensor pickup 250 is positioned, as indicated by broken lines in FIG. 14, close to the external periphery of the sensor rotor 240. Seal members 251, 253 are provided respectively between a lateral rim of the inner ring 210 and the outer ring 220.

In the following there will be explained the function of the present embodiment. Rotation of the outer ring 220 together with the wheel causes integral rotation of the sensor rotor 240, whereby the apertures 248 of the annular member 244 and other parts thereof alternately pass before the sensor 250, thus producing periodical changes in the magnetic flux in front of said sensor 250. The rotation of the wheel can be obtained by detecting said changes.

Rain water eventually present on the outer ring 220 and/or sensor rotor 240 does not deteriorate the accuracy of detection of the revolution, because the surfaces of the annular member 244 are protected by the protective member 246. The annular member, being protected by the protective member 246 on the internal and external peripheries and on the lateral faces and having no exposed portions, does not generate rust.

Also the annular member 244 is mounted by the internal periphery of the protective member 246 onto the external periphery of the cylindrical portion 222 of the outer ring 220, and this fact facilitates the mounting of the annular member on said cylindrical portion 222. The protective member 246, being composed of a plastic material and capable of certain deformation in the radial direction, can absorb a certain dimensional error between the outer diameter of the cylindrical portion 222 and the inner diameter of the protective member 246. Consequently, the inner diameter of the annular member 244 need not be strictly controlled but can be so selected as to loosely fit on the cylindrical portion 222.

In the following there will be explained variations of the foregoing embodiment. For the purpose of simplicity, the explanation will be concentrated on areas different from the foregoing embodiment, and the equivalent components will be represented by corresponding numbers and will be omitted from the explanation.

Figure 16:
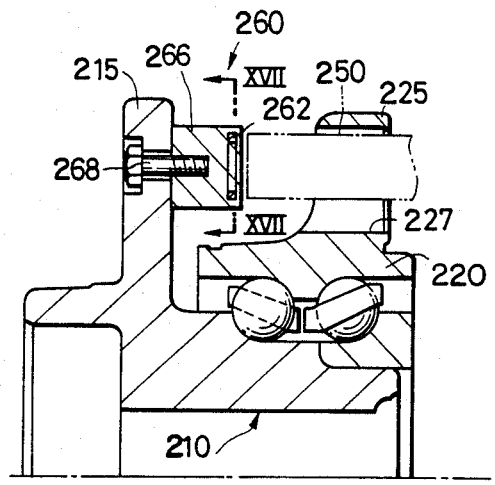
FIG. 16 is a partially cut-away elevation view showing a variation of the embodiment shown in FIG. 14.
Figure 17:
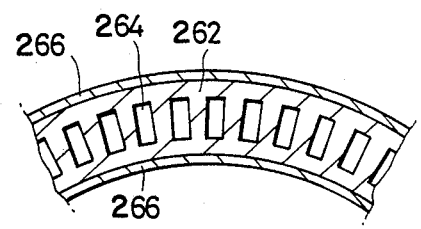
FIG. 17 is a cross sectional view along a line XVII—XVII in FIG. 16.

A variation shown in FIGS. 16 and 17 is marked by a sensor rotor 260 and a sensor 250 positioned as to mutually face in the axial direction. An annular member 262 is composed of a disk with a central aperture and with a vertically oblong rectangular cross section, having, as shown in FIG. 17, a plurality of radially extended apertures 264. The annular member 262 is protected, on both surfaces and on external and internal peripheries, by a plastic annular protective member 266, which is fixed with screws 268 on the flange portion 215 of the inner ring 210. The sensor 250 is set in the axial direction, in an axial hole 227 formed in an extended portion 225 of the outer ring 220.

This variation is applicable to a bearing assembly with rotating inner ring, and provides flexibility in the mounting of the sensor rotor 260 and the sensor 250.

Figure 18:
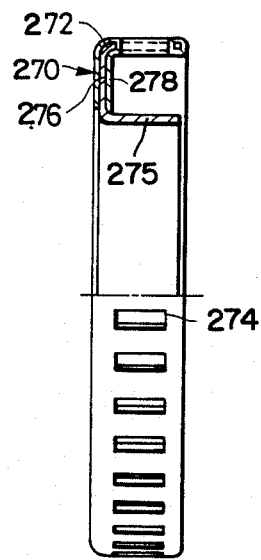
FIGS. 18 and 19 are partially cut-away elevation views showing variations of the sensor rotor.

In addition, it is also possible, as shown in FIG. 18, to employ an annular member 270 with a square-U-shaped cross section, having a plurality of apertures 274 on a larger diameter portion 272, and to protect both faces of a radial portion 276 and both faces of said larger diameter portion 272, with a protective member 278, including the rims of said apertures 274 but so as not to close said apertures 274. It is furthermore possible, as shown in FIG. 19, to employ an annular member 280 with a square U-shaped cross section and to protect both faces of a radial portion 286 and both faces of the larger diameter portion 282 with a protective member 288 so as to fill the apertures 284.

Figure 19:
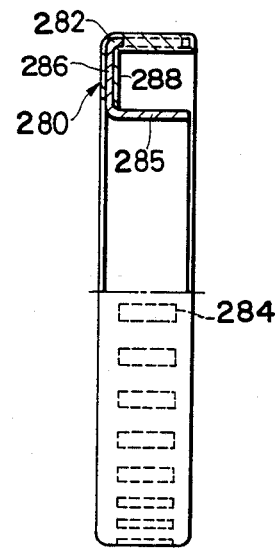

In the sensor rotor 270 or 280 shown in FIG. 18 or 19, a smaller diameter portion 275 or 285 serves for mounting on a rotating member.

The present invention is naturally subject to various modifications and alterations within the scope and spirit of the appended claims. For example, the annular member is not limited to the details of construction disclosed in the foregoing embodiments, but can serve the purpose if it is formed as an annular form or a ring as a whole.

I claim:

1. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
   a pulser gear is fitted on said outer ring, said pulser gear comprises a cylindrical member of magnetic plate material having a plurality of through holes mutually separated along the circumferential direction of a main portion thereof, and said pulser gear is fitted on an outer periphery of said outer ring such that portions of said outer periphery of said outer ring constitute respective bottom faces of said through holes,
   whereby revolution of said rotating member can be detected by a sensor positioned close to said pulser gear.

2. A bearing assembly according to claim 1, wherein said rotating member is a wheel mounting portion of a vehicle.

3. A bearing assembly according to claim 1, wherein said through holes are punched.

4. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
   a pulser gear is fitted to said outer ring via a first cylindrical member, said pulser gear comprises a second cylindrical member of magnetic plate material having a plurality of through holes mutually separated along the circumferential direction of a main portion thereof, said first cylindrical member is fitted to an outer periphery of said outer ring, and said second cylindrical member is fitted on an outer periphery of said first cylindrical member such that portions of said outer periphery of said first cylindrical member constitute respective bottom faces of said through holes, whereby revolution of said rotating member can be detected by a sensor positioned close to said pulser gear.

5. A bearing assembly according to claim 4, wherein said rotating member is a wheel mounting portion of a vehicle.

6. A bearing assembly according to claim 4, wherein said through holes are punched.

7. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

a pulse gear is fitted on said outer ring, said pulser gear comprises an annular member of magnetic plate material including a cylindrical mounting portion mounted onto said outer ring, a gear portion parallel to said mounting portion and spaced radially outwardly therefrom, which gear portion has a plurality of through holes mutually separated in a circumferential direction of said gear portion, and a radially extending connecting portion connecting said mounting portion and said gear portion, whereby revolution of said rotating member can be detected by a sensor positioned close to said pulser gear.

8. A bearing assembly according to claim 7 wherein said rotating member is a wheel mounting portion of a vehicle.

9. A bearing assembly according to claim 7, wherein the radially inner and outer surfaces of said gear portion have a protective plastic covering.

10. A bearing assembly according to claim 9, wherein said connecting portion also has a protective plastic covering.

11. A bearing assembly according to claim 7, wherein said through holes are punched.

12. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

said outer ring has a cylindrical portion and a flange portion, a pulser gear is mounted on said cylindrical portion of said outer ring, said pulser gear comprises a cylindrical member formed of magnetic plate material and provided with a plurality of through holes mutually separated in a circumferential direction of said cylindrical member, at least the internal and external peripheries of said cylindrical member are covered by a plastic protective member, and said pulser gear is fitted, at the internal periphery of said protective member, on the external periphery of said outer ring, whereby revolution of said rotating member can be detected by a sensor positioned close to said pulser gear.

13. A bearing assembly according to claim 12 wherein said rotating member is a wheel mounting portion of a vehicle.

14. A bearing assembly according to claim 12, wherein said through holes are punched.

15. A bearing assembly having an inner ring and an outer ring positioned outside of and concentrically with said inner ring, with rotatable members therebetween, in which said inner ring is integrally fixed to a rotating member and is rendered rotatable relative to said outer ring, characterized in that:

said inner ring has a cylindrical portion and a flange portion, a pulser gear is mounted on said inner ring, said pulser gear comprises an annular disk member of magnetic plate material having a plurality of through holes mutually separated in a circumferential direction of said disk member, at least lateral faces of said disk member are covered by a plastic protective member, and said pulser gear is fitted at one lateral surface of said protective member on said flange portion of said inner ring, whereby revolution of said rotating member can be detected by a sensor positioned close to said pulser gear.

16. A bearing assembly according to claim 15, wherein said rotating member is a wheel mounting portion of a vehicle.

* * * * *

REEXAMINATION CERTIFICATE (1835th)
United States Patent [19]
Hayashi

[11] B1 4,795,278
[45] Certificate Issued Nov. 3, 1992

[54] BEARING ASSEMBLY

[75] Inventor: Yoshitaka Hayashi, Fujisawa, Japan

[73] Assignee: Nippon Seiko Kabushiki Kaisha, Tokyo, Japan

Reexamination Request:
No. 90/002,435, Sep. 9, 1981

Reexamination Certificate for:
Patent No.: 4,795,278
Issued: Jan. 3, 1989
Appl. No.: 123,205
Filed: Nov. 20, 1987

[30] Foreign Application Priority Data

Nov. 28, 1986 [JP] Japan ............... 61-182040[U]
Apr. 1, 1987 [JP] Japan ............... 62-77450
Jul. 28, 1987 [JP] Japan ............... 62-186665

[51] Int. Cl.$^5$ .............. F16C 19/52; G01P 3/487; H02K 21/38
[52] U.S. Cl. .............. 384/448; 384/544; 310/155; 310/168; 324/174; 324/208
[58] Field of Search ........... 384/448, 544, 446, 621, 384/535, 8; 310/90, 155, 168; 324/174, 166, 167, 207.25, 207.22, 207.13

[56] References Cited
U.S. PATENT DOCUMENTS

| | | | |
|---|---|---|---|
| 3,626,226 | 12/1971 | Pauwels et al. | 310/168 |
| 3,735,167 | 5/1973 | Wickersheimer | 310/168 |
| 3,780,313 | 12/1973 | Wiegand | 324/174 |
| 3,890,517 | 6/1975 | Marsh et al. | 310/168 |
| 3,916,234 | 10/1975 | Stigall et al. | 310/155 |
| 4,017,756 | 4/1977 | Davidson | 310/168 |
| 4,161,120 | 7/1979 | Cloarec | 324/173 X |
| 4,171,495 | 10/1979 | McNinch, Jr. | 310/155 |
| 4,259,637 | 3/1981 | Bloomfield et al. | 324/166 |
| 4,667,156 | 5/1987 | Machino et al. | 324/173 |

FOREIGN PATENT DOCUMENTS

| | | | |
|---|---|---|---|
| 2403854 | 5/1980 | Fed. Rep. of Germany . | |
| 2475228 | 8/1981 | France | 324/173 |
| 154015 | 9/1982 | Japan | 324/173 |
| 637674 | 12/1978 | U.S.S.R. | 324/174 |

*Primary Examiner*—Thomas R. Hannon

[57] ABSTRACT

A bearing assembly comprising a bearing including an inner and outer rings one of which is fixed to a rotating member, and a pulser gear fixed to the rotating member. The pulser gear is composed of an annular magnetic plate member and having a plurality of punched through holes mutually separated along a circumferential direction thereof. Revolution of the rotating member can be detected by a sensor provided close to the pulser gear.

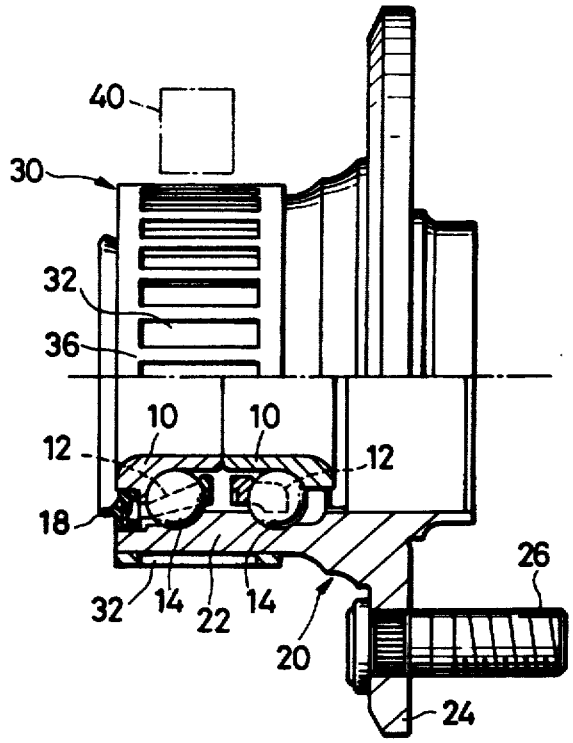

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15 and 16 is confirmed.

Claims 1, 4, 7, 12 are determined to be patentable as amended.

Claims 2, 3, 5, 6, 8-11, 13 and 14, dependent on an amended claim, are determined to be patentable.

New claims 17-37 are added and determined to be patentable.

1. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
  a pulser gear is fitted on said outer ring, said pulser gear comprises a *circumferentially endless* cylindrical *tubular blank* member of magnetic plate material having *had formed therein* a plurality of through holes [mutually separated along the circumferential direction of a main portion thereof] *spaced uniformly about its entire circumference*, and said pulser gear is fitted on an outer periphery of said outer ring such that portions of said outer periphery of said outer ring constitute respective bottom faces of said through holes,
  whereby revolution of said rotating member can be detected by a sensor positioned close to said pulser gear.

4. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
  a pulser gear is fitted to said outer ring via a first cylindrical member, said pulser gear comprises a second cylindrical member *constituted by a circumferentially endless cylindrical tubular blank* of magnetic plate material having *had formed therein* a plurality of through holes mutually separated along the circumferential direction of a main portion thereof, said first cylindrical member is fitted to an outer periphery of said outer ring, and said second cylindrical member is fitted on an outer periphery of said first cylindrical member such that portions of said outer periphery of said first cylindrical member constitute respective bottom faces of said through holes,
  whereby revolution of said rotating member can be detected by a sensor positioned close to said pulser gear.

7. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
  a [pulse] *pulser* gear is fitted on said outer ring, said pulser gear comprises an annular member of magnetic plate material including a cylindrical mounting portion mounted onto *the outer periphery of* said outer ring, a gear portion parallel to said mounting portion, *axially displaced therefrom* and spaced radially outwardly therefrom, which gear portion has a plurality of through holes mutually separated in a circumferential direction of said gear portion, and a radially extending connecting portion connecting said mounting portion and said gear portion,
  whereby revolution of said rotating member can be detected by a sensor positioned close to said pulser gear.

12. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:
  said outer ring has a cylindrical portion and a flange portion, a pulser gear is mounted on said cylindrical portion of said outer ring, said pulser gear comprises a cylindrical member formed of magnetic plate material and provided with a plurality of through holes mutually separated and in a circumferential direction of said cylindrical member, [at least the internal and external peripheries of] said cylindrical member [are covered by] *being embedded within* a plastic protective member *which covers the internal and external peripheries of said cylindrical member*, and said pulser gear is fitted, at the internal periphery of said protective member, on the external periphery of said outer ring,
  whereby revolution of said rotating member can be detected by a sensor positioned close to said pulser gear.

*17. A bearing assembly according to claim 1, wherein the outer periphery of said pulser gear is provided with a protective plastic covering.*

*18. A bearing assembly according to claim 4, wherein said through holes are spaced uniformly about the entire circumference of said second cylindrical member.*

*19. A bearing assembly according to claim 12, wherein said cylindrical member is constituted by a circumferentially endless tubular blank member having had said through holes formed therein.*

*20. A bearing assembly according to claim 19, wherein said through holes are spaced uniformly about the entire circumference of said cylindrical member.*

*21. A bearing assembly according to claim 15, wherein said pulser gear is mounted on a part of said flange portion projecting radially outwardly beyond a cylindrical main portion of said outer ring.*

*22. A bearing assembly according to claim 15, wherein said pulser gear has a larger inner diameter than the inner diameter of said outer ring.*

*23. A bearing assembly according to claim 15, wherein said protective member is secured at said one lateral sur-* face thereof to said flange portion of said inner ring by screw means.

24. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

a pulser gear is fitted on said outer ring, said pulser gear comprises a cylindrical member of magnetic plate material having a plurality of through holes mutually separated along the circumferential direction of a main portion thereof, and said pulser gear is fitted on an outer periphery of said outer ring such that portions of said outer periphery of said outerring constitute respective bottom faces of said through holes, a sensor is positioned in close opposition to the outer periphery of said pulser gear to detect revolution of said rotating member from magnetic fluctuations due to rotational movement of said pulser gear relative to said sensor, and the outer periphery of said pulser gear is provided with a protective plastic covering.

25. A bearing assembly according to claim 24, wherein said cylindrical member is constituted by a circumferentially endless tubular blank having had said through holes formed therein.

26. A bearing assembly according to claim 25, wherein said through holes are spaced uniformly about the entire circumference of said cylindrical member.

27. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

a pulser gear is fitted to said outer ring via a first cylindrical member, said pulser gear comprises a second cylindrical member of magnetic plate material having a plurality of through holes mutually separated along the circumferential direction of a main portion thereof, said first cylindrical member is fitted to an outer periphery of said outer ring, and said second cylindrical member is fitted on an outer periphery of said first cylindrical member such that portions of said outer periphery of said first cylindrical member constitute respective bottom faces of said through holes, a sensor is positioned in close opposition to the outer periphery of said pulser gear to detect revolution of said rotary member from magnetic fluctuations due to rotational movement of said pulser gear relative to said sensor, and the outer periphery of said pulser gear is provided with a protective plastic covering.

28. A bearing assembly according to claim 27, wherein said cylindrical member is constituted by a circumferentially endless tubular blank member having had said through holes formed therein.

29. A bearing assembly according to claim 28, wherein said through holes are spaced uniformly about the entire circumference of said second cylindrical member.

30. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

a pulser gear is fitted on said outer ring, said pulser gear comprises an annular member of magnetic plate material including a cylindrical mounting portion mounted onto said outer ring, a gear portion parallel to said mounting portion and spaced radially outwardly therefrom, which gear portion has a plurality of through holes mutually separated in a circumferential direction of said gear portion, and a radially extending connecting portion connecting said mounting portion and said gear portion, a sensor is positioned in close opposition to the outer periphery of said gear portion to detect revolution of said rotating member from magnetic fluctuations due to rotational movement of said pulser gear relative to said sensor, and the outer periphery of said gear portion is provided with a protective plastic covering.

31. A bearing assembly according to claim 30, wherein said gear portion is embedded within protective plastic.

32. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

said outer ring has a cylindrical portion and a flange portion, a pulser gear is mounted on said cylindrical portion of said outer ring, said pulser gear comprises a cylindrical member formed of magnetic plate material and provided with a plurality of through holes mutually separated in a circumferential direction of said cylindrical member, at least the internal and external peripheries of said cylindrical member are covered by a plastic protective member, and said pulser gear is fitted, at the internal periphery of said protective member, on the external periphery of said outer ring, and a sensor is provided in close opposition to the external periphery of said cylindrical member to detect revolution of said rotating member from magnetic fluctuations due to rotational movement of said pulser gear relative to said sensor.

33. A bearing assembly according to claim 30, wherein said cylindrical member is constituted by a circumferentially endless tubular blank having had said through holes formed therein.

34. A bearing assembly according to claim 33, wherein said through holes are spaced uniformly about the entire circumference of said cylindrical member.

35. A bearing assembly having an inner ring and an outer ring positioned outside of and concentrically with said inner ring, with rotatable members therebetween, in which said inner ring is integrally fixed to a rotating member and is rendered rotatable relative to said outer ring, characterized in that:

said inner ring has a cylindrical portion and a flange portion, a pulser gear is mounted on said inner ring, said pulser gear comprises an annular disk member of magnetic plate material having a plurality of through holes mutually separated in a circumferential direction of said disk member, at least lateral faces of said disk member are covered by a plastic protective member, and said pulser gear is fitted at one lateral surface of said protective member on said flange portion of said inner ring, and a sensor is positioned adjacent to an opposite lateral surface of said protective member and in close opposition to a said face of said disk member to detect revolution of said rotating member from magnetic fluctuations due to rotational movement of said pulser gear relative to said sensor.

36. A bearing assembly having an inner ring and an outer ring positioned outside of and concentrically with said inner ring, with rotatable members therebetween, in which said outer ring is integrally fixed to a rotating member and is rendered rotatable relative to said inner ring, characterized in that:

a pulser gear is fitted on said outer ring, said pulser gear comprises an annular member of magnetic plate material including a cylindrical mounting portion mounted onto the outer periphery of said outer ring, a gear portion parallel to said mounting portion and spaced radially outwardly therefrom, which gear portion has a plurality of through holes mutually separated in a circumferential direction of said gear portion, and a radially extending connecting portion connecting said mounting portion and said gear portion and disposed substantially entirely to one side of said through holes in an axial direction of said annular member, whereby revolution of said rotating member can be detected by a sensor positioned close to said pulser gear, and wherein the radially inner and outer surfaces of said gear portion have a protective plastic covering.

37. A bearing assembly according to claim 36, wherein said connecting portion also has a protective plastic covering.

* * * * *